(12) United States Patent
Mihlbauer et al.

(10) Patent No.: US 11,641,848 B1
(45) Date of Patent: May 9, 2023

(54) VARIABLE FLOW SPOUT FOR AN AQUARIUM

(71) Applicant: Central Garden & Pet Company, Walnut Creek, CA (US)

(72) Inventors: Brad L. Mihlbauer, Mukwonago, WI (US); Ernie Katris, Franklin, WI (US); Phillip Bartoszek, New Berlin, WI (US)

(73) Assignee: Central Garden & Pet Company, Walnut Creek, CA (US)

( * ) Notice: Subject to any disclaimer, the term of this patent is extended or adjusted under 35 U.S.C. 154(b) by 161 days.

(21) Appl. No.: 17/151,120

(22) Filed: Jan. 16, 2021

Related U.S. Application Data

(63) Continuation-in-part of application No. 16/867,112, filed on May 5, 2020, now Pat. No. 11,412,717.

(51) Int. Cl.
*A01K 63/04* (2006.01)
*B05B 15/652* (2018.01)
*B05B 15/656* (2018.01)

(52) U.S. Cl.
CPC .......... *A01K 63/047* (2013.01); *A01K 63/045* (2013.01); *B05B 15/652* (2018.02); *B05B 15/656* (2018.02)

(58) Field of Classification Search
CPC .. A01K 63/006; A01K 63/045; A01K 63/047; B65D 47/06; B65D 83/28; B65D 25/48; B05B 15/656; B05B 15/652
USPC ......... 119/259; 222/567, 566; 251/353, 352, 251/351
See application file for complete search history.

(56) References Cited

U.S. PATENT DOCUMENTS

| | | |
|---|---|---|
| 3,288,110 A | 11/1966 | Jerome |
| 3,485,373 A | 12/1969 | Powers |
| 3,511,376 A | 5/1970 | Sesholtz |
| 3,513,978 A | 5/1970 | Newsteder |
| 3,651,785 A | 3/1972 | Quinn |
| 3,983,843 A | 10/1976 | Johnson |
| 4,036,756 A | 7/1977 | Dockery |
| 4,039,453 A | 8/1977 | Horvath |
| 4,093,547 A | 6/1978 | Sherman et al. |
| 4,154,681 A | 5/1979 | Kershaw et al. |
| 4,163,035 A | 7/1979 | Gorsky |
| 4,206,719 A | 6/1980 | Faris |
| 4,220,530 A | 9/1980 | Gabriele |
| 4,282,095 A | 8/1981 | Tsuhako |
| 4,285,813 A | 8/1981 | Stewart et al. |
| 4,490,250 A | 12/1984 | Dockery |

(Continued)

*Primary Examiner* — Brady W Frazier
*Assistant Examiner* — Zoe Tam Tran

(57) ABSTRACT

An aquarium includes a container that contains a liquid. A spout includes a first leg that extends along a first axis from an inlet positioned in a bottom portion of the aquarium space to a bend, and a second leg that extends along a second axis from a flow aperture formed adjacent the bend to an outlet. The spout is arranged to direct a portion of the liquid from the inlet to the outlet. A cap is coupled to the spout and is rotatable between a first position and a second position. The cap includes a seal element positioned to form a seal between the cap and the spout, and a flow control member fixedly attached to the cap and sized to completely block the flow aperture when the cap is in the first position and to completely uncover the flow aperture when the cap is in the second position.

19 Claims, 14 Drawing Sheets

(56) References Cited

U.S. PATENT DOCUMENTS

| | | |
|---|---|---|
| 4,512,885 A | 4/1985 | Willinger |
| 4,601,821 A | 7/1986 | Sherman et al. |
| 4,602,996 A * | 7/1986 | Willinger ............. A01K 63/045 210/136 |
| 4,620,924 A | 11/1986 | Goldman et al. |
| 4,684,462 A | 8/1987 | Augustyniak |
| 4,761,227 A | 8/1988 | Willinger et al. |
| 4,802,980 A | 2/1989 | Gilkey |
| 4,807,565 A | 2/1989 | Hawthorne |
| 4,820,410 A | 4/1989 | Cavalcante |
| 4,842,727 A | 6/1989 | Willinger et al. |
| 4,895,646 A | 1/1990 | Willinger |
| 4,936,981 A | 6/1990 | Baisley |
| 4,957,623 A | 9/1990 | Henzlik |
| 4,978,444 A | 12/1990 | Rommel |
| 4,997,559 A | 3/1991 | Ellis et al. |
| 5,002,660 A | 3/1991 | Sherman et al. |
| 5,096,576 A | 3/1992 | Szabo |
| 5,098,585 A | 3/1992 | Woltman et al. |
| 5,108,594 A | 4/1992 | Giovanetti et al. |
| 5,139,656 A | 8/1992 | Gonnello |
| 5,160,607 A | 11/1992 | Thiemer et al. |
| 5,171,438 A | 12/1992 | Korcz |
| 5,172,650 A | 12/1992 | Hsu |
| 5,228,986 A | 7/1993 | Ellis et al. |
| 5,242,582 A | 9/1993 | Marioni |
| 5,245,945 A | 9/1993 | Liao |
| 5,282,961 A * | 2/1994 | Ellis .................... A01K 63/047 416/169 R |
| 5,290,436 A | 3/1994 | Danner |
| 5,306,421 A | 4/1994 | Weinstein |
| 5,397,463 A | 3/1995 | Woltmann |
| 5,401,401 A | 3/1995 | Hickok et al. |
| 5,409,603 A | 4/1995 | Tsung |
| 5,419,831 A | 5/1995 | Fuerst et al. |
| 5,423,978 A | 6/1995 | Snyder et al. |
| 5,453,182 A | 9/1995 | Kikuta |
| 5,474,673 A | 12/1995 | Ludlow |
| 5,501,790 A | 3/1996 | Wiedemann |
| 5,514,280 A | 5/1996 | Logan |
| 5,518,611 A | 5/1996 | Bresolin |
| 5,585,010 A | 12/1996 | Dockery |
| 5,603,831 A | 2/1997 | Hickok |
| 5,618,428 A | 4/1997 | Oslund |
| 5,628,281 A | 5/1997 | Kelley |
| 5,628,905 A | 5/1997 | Montalbano |
| 5,632,887 A | 5/1997 | Gargas et al. |
| 5,679,253 A | 10/1997 | Fuerst et al. |
| 5,728,293 A | 3/1998 | Guoli et al. |
| 5,779,885 A | 7/1998 | Hickok et al. |
| 5,853,591 A | 12/1998 | Snyder et al. |
| 5,965,016 A | 10/1999 | Suchowski et al. |
| 6,202,597 B1 | 3/2001 | Hsiung |
| 6,202,677 B1 | 3/2001 | Chen |
| 6,523,498 B1 | 2/2003 | Shyu |
| 6,770,194 B1 * | 8/2004 | McGrath ................ A01K 63/04 137/395 |
| 6,797,163 B2 | 9/2004 | Carley et al. |
| 6,843,909 B1 | 1/2005 | Woltmann |
| 6,869,530 B1 | 3/2005 | Venezia |
| 7,001,509 B1 | 2/2006 | Lin |
| 7,022,227 B1 | 4/2006 | Liao |
| 7,241,379 B2 | 7/2007 | Agresta |
| 7,252,762 B2 | 8/2007 | Carley |
| 7,273,547 B2 | 9/2007 | Ogawa |
| 7,288,189 B2 | 10/2007 | Bonifer |
| 7,316,775 B2 | 1/2008 | Carley et al. |
| 7,425,274 B1 | 9/2008 | Helfet |
| 7,429,321 B2 | 9/2008 | Willinger |
| 7,488,417 B2 | 2/2009 | Chauquet et al. |
| 7,569,139 B2 | 8/2009 | Mihlbauer et al. |
| 7,594,998 B2 | 9/2009 | Mihlbauer et al. |
| 7,601,259 B2 | 10/2009 | Mihlbauer et al. |
| 7,618,534 B2 | 11/2009 | Mihlbauer et al. |
| 7,628,913 B2 | 12/2009 | Willinger |
| 7,638,044 B2 | 12/2009 | Huehn et al. |
| 7,651,609 B2 | 1/2010 | Huehn |
| 7,708,883 B2 | 5/2010 | Wong |
| 7,771,592 B2 | 8/2010 | Mihlbauer et al. |
| 7,832,358 B2 | 11/2010 | Tsai |
| 7,927,483 B2 | 4/2011 | Huehn |
| 8,132,534 B2 | 3/2012 | Arita et al. |
| 8,453,605 B2 | 6/2013 | Tominaga et al. |
| 8,551,329 B2 * | 10/2013 | Paxton ................ A01K 63/045 210/167.13 |
| 9,788,533 B2 | 10/2017 | Allen et al. |
| 2003/0205512 A1 | 11/2003 | Chen |
| 2004/0050759 A1 | 3/2004 | Ogawa |
| 2004/0222137 A1 | 11/2004 | Hashimoto |
| 2006/0049086 A1 * | 3/2006 | Axelrod ............... A01K 63/045 210/167.22 |
| 2006/0102537 A1 | 5/2006 | Hochgesang |
| 2006/0102538 A1 | 5/2006 | Chang |
| 2007/0138075 A1 * | 6/2007 | Chang ................. A01K 63/045 119/260 |
| 2007/0262012 A1 | 11/2007 | Wong |
| 2008/0272156 A1 * | 11/2008 | Dyson ................. A47J 31/4482 222/538 |
| 2009/0056638 A1 | 3/2009 | Ting |
| 2009/0178623 A1 | 7/2009 | Ford |
| 2009/0255480 A1 | 10/2009 | Tsai |
| 2010/0236489 A1 | 9/2010 | Arita |
| 2011/0162585 A1 | 7/2011 | Tominaga et al. |
| 2012/0325755 A1 * | 12/2012 | Turover ................ A01K 63/10 119/264 |
| 2013/0152866 A1 * | 6/2013 | Turover ............... A01K 63/003 119/264 |
| 2013/0284107 A1 | 10/2013 | Lari |
| 2014/0216351 A1 | 8/2014 | Blake |
| 2015/0000607 A1 | 1/2015 | Reid et al. |
| 2019/0151782 A1 * | 5/2019 | Himes .................... B01D 35/26 |
| 2019/0166809 A1 * | 6/2019 | Yu ....................... F04D 15/0016 |
| 2019/0269108 A1 * | 9/2019 | Watson ................ A01K 63/045 |

* cited by examiner

VARIABLE FLOW SPOUT FOR AN AQUARIUM

BACKGROUND

Aquariums are often kept in homes or offices as decorative elements. In order to maintain the environment for any animals or plants in the aquarium it is often necessary to circulate the fluid (generally water) within the tank or container and to sometimes change some or all of the fluid. In most aquariums, the quantity or rate of water filtration is fixed by the pump size. The filtering and water change processes can be messy and often include some water spillage.

BRIEF SUMMARY

In one aspect, an aquarium includes a container that defines a perimeter and an aquarium space, a filter space arranged to receive a fluid, and a filter holder coupled to the container. The filter holder defines the filter space and is operable to direct the fluid from the filter space into the container. A pump operates to draw the fluid from the container, and a spout is coupled to the pump to selectively receive the fluid. The spout includes a first leg that extends along a first axis and a second leg that extends along a second axis and defines an outlet. The first leg and the second leg cooperate to define a flow aperture. The aquarium also includes a cap coupled to the spout and movable between a first position and a second position. A flow control member is coupled to the cap and is movable with the cap between the first position where a low level of flow passes through the flow aperture and the second position where a high level of flow passes through the flow aperture.

In another aspect, an aquarium includes a container that defines a perimeter and an aquarium space, a filter holder disposed within the perimeter and including a filter space, a pump space, and a pump discharge space. A pump is positioned within the pump space and operates to draw a fluid from the container and discharge the fluid into the pump discharge space. A spout includes a first leg that extends along a first axis from an inlet to a bend, and a second leg that extends along a second axis from a flow aperture formed adjacent the bend to an outlet where the fluid is discharged. The aquarium also includes a cap coupled to the spout and rotatable about the first axis between a first position and a second position. A flow control member is fixedly attached to the cap and is sized to completely block the flow aperture when the cap is in the first position and to continuously increase the amount of the flow aperture that is not blocked as the cap is rotated from the first position toward the second position.

In yet another aspect, an aquarium includes a container that defines a perimeter and an aquarium space that contains a liquid. A spout includes a first leg that extends along a first axis from an inlet positioned in a bottom portion of the aquarium space to a bend, and a second leg that extends along a second axis from a flow aperture formed adjacent the bend to an outlet. The spout is arranged to direct a portion of the liquid from the inlet to the outlet. A cap is coupled to the spout and is rotatable between a first position and a second position. The cap includes a seal element positioned to form a seal between the cap and the spout, and a flow control member fixedly attached to the cap and sized to completely block the flow aperture when the cap is in the first position and to completely uncover the flow aperture when the cap is in the second position.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

It should be understood that the words or phrases used herein should be construed broadly, unless expressly limited. For example, the terms "include," "comprise," and "having" as well as derivatives should be interpreted as inclusive without limitation. The singular forms "a", "an" and "the" are intended to include the plural forms as well, unless the context clearly indicates otherwise. Further, the term "and/or" as used herein refers to and encompasses any and all possible combinations of one or more of the associated listed items.

Also, although terms such as "first", "second", "third" and so forth may be used herein to refer to various elements, information, functions, or acts, these elements, information, functions, or acts should not be limited by these terms and no specific order should be implied or interpreted. Rather these numeral adjectives are used to distinguish different elements, information, functions or acts from each other.

The phrase "adjacent to" may mean that an element is relatively near to but not in contact with another element or that the element is in contact with the other element, unless the context clearly indicates otherwise. In addition, in some contexts, "adjacent to" or "near to" and similar phrases simply mean that the element is closer to the other element described. For example, an element described as being "near" a first end of another element having a first end and a second end is simply positioned closer to the first end than to the second end.

Terms of degree such as "about", approximately, and the like are generally interpreted as being within well-known industrial tolerances for the particular feature. If no such standard exists, terms of degree should be interpreted as meaning plus or minus twenty percent unless another clear standard is provided.

None of the following description should be read as implying that any particular element, step, act, or function is an essential element, which must be included in the claim scope. In addition, while multiple variations, embodiments, and constructions are described, it should be understood that any aspect described with one embodiment, variation, or construction is equally applicable to the other variations, embodiments, or constructions unless explicitly stated otherwise.

Figure 1:
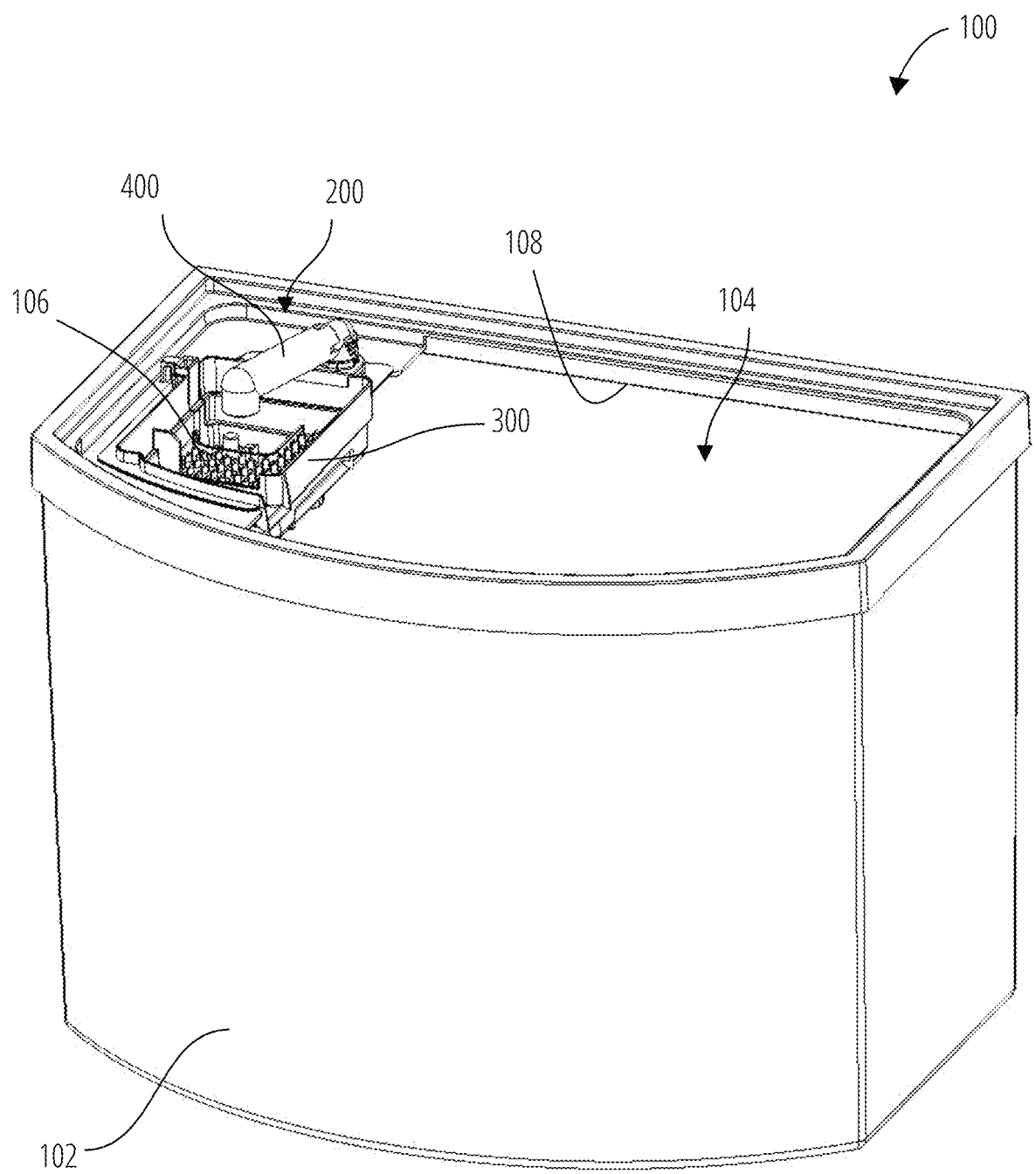
FIG. 1 illustrates an aquarium having a container that contains a fluid.

FIG. 1 illustrates one form of an aquarium 100 that is commonly used in homes or offices to display aquatic animals and plants, amphibians, reptiles, insects, or other small animals. The aquarium 100 of FIG. 1 is configured to hold aquatic animals and plants and includes a container 102 that defines an aquarium space 104 sized to receive a desired quantity of fluid (e.g., fresh water, salt water, etc.).

A filter assembly 200 includes a filter holder 300 and a spout 400 with the filter holder 300 engaging the container 102 and supported at a desired height within the container 102. The filter holder 300 supports the spout 400 and defines a filter space 106 that is sized and shaped to receive a filter or filter media. In preferred constructions, a portion of the filter holder 300 is submerged in the fluid by filling the container 102 to a water line 108. With the fluid at the level of the water line 108, the filter and in particular the inlet side of the filter is disposed above the water line 108 with the discharge or outlet side of the filter being at or slightly above the water line 108 to assure that fluid is easily discharged into the aquarium space 104 without undue noise or splashing.

Figure 2:
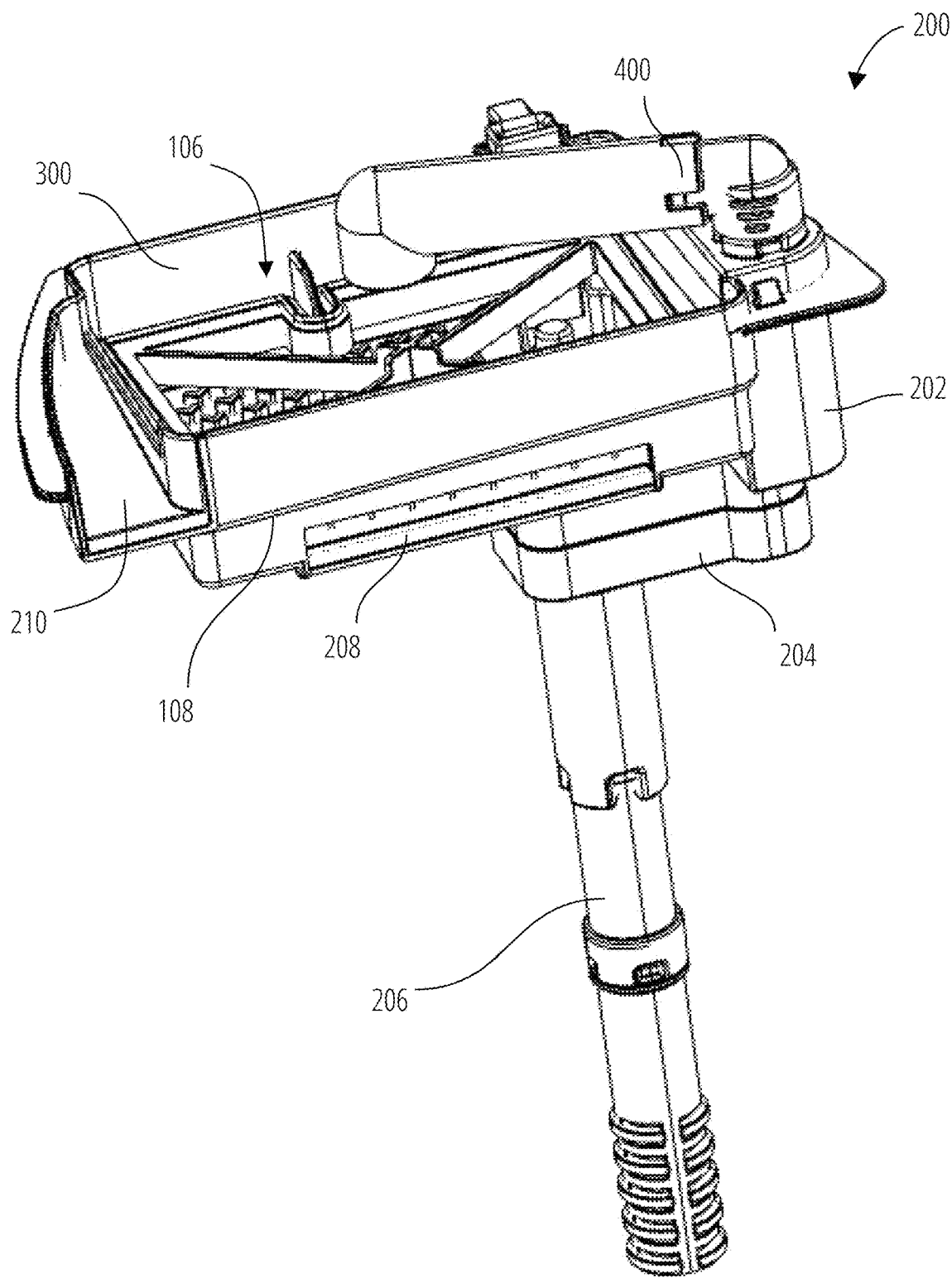
FIG. 2 illustrates a filter assembly for use with the aquarium of FIG. 1.

With reference to FIG. 2, the filter assembly 200 is illustrated in greater detail. In addition to the filter holder 300 and the spout 400, the filter assembly 200 further includes a pump discharge space 202, a pump housing 204, an intake tube 206, a discharge channel 208, and an overflow chute 210.

The intake tube 206 is an elongated generally hollow tube that includes one or more openings near a lowermost portion (the portion spaced furthest from the spout 400) that are arranged to allow for the admission of fluid into the intake tube 206. The end of the intake tube 206 opposite the lowermost portion attaches to the pump housing 204 to facilitate fluid communication between the pump housing 204 and the fluid in the aquarium 100. In the illustrated construction, the intake tube 206 is formed from a plurality of portions positioned in a telescoping arrangement. This arrangement allows the user to position the lowermost end of the intake tube 206 at any desired depth within the aquarium space 104.

The pump discharge space 202 is formed adjacent the pump housing 204 such that fluid can be delivered from the pump housing 204 to the pump discharge space 202. In preferred constructions, portions of the pump discharge space 202 and the pump housing 204 are formed as one piece with the filter holder 300. However, other constructions may include separately formed portions that are attached to the filter holder 300 to complete the pump discharge space 202 or the pump housing 204.

With continued reference to FIG. 2, the filter holder 300 defines the discharge channel 208 and the overflow chute 210. The discharge channel 208 is an elongated channel that is preferably arranged to rest just below the water line 108 and below the filter space 106. Fluid that passes through the filter space 106 and the filter disposed in the filter space 106 is generally discharged through the discharge channel 208. However, if for some reason, the fluid cannot pass through the filter or the filter space 106 at a sufficient rate, excess fluid can flow back into the aquarium space 104 via the overflow chute 210. In the illustrated construction, the overflow chute 210 terminates at an outlet end that is disposed at about the water line 108.

While the illustrated construction includes a filter holder 300 that defines the discharge channel 208 and the overflow chute 210 as part of the filter holder 300, other arrangements could include separate pieces that attach to the filter holder 300 to define parts of one or both of the discharge channel 208 and the overflow chute 210.

Figure 3:
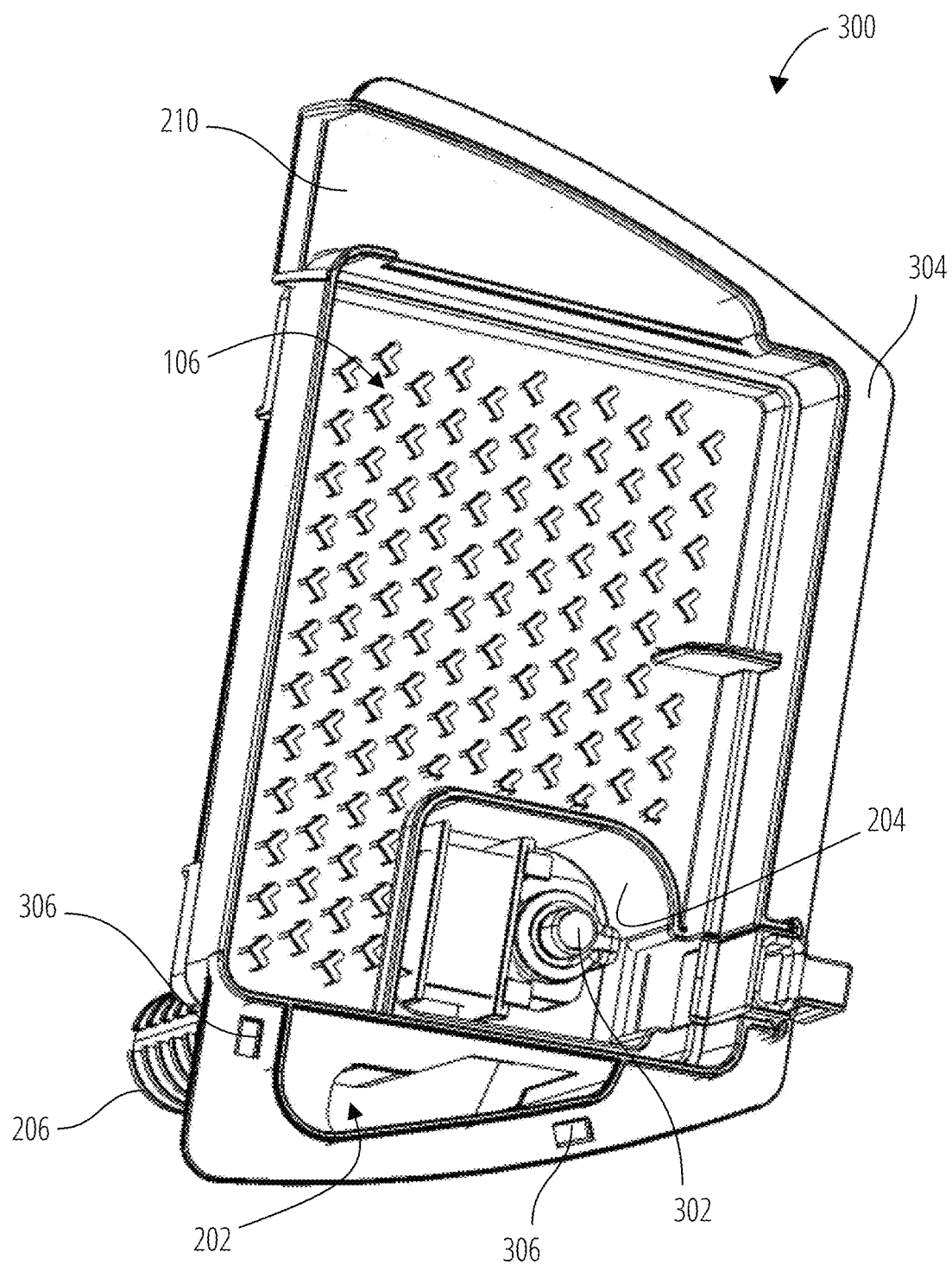
FIG. 3 illustrates a filter holder for use in the filter assembly of FIG. 2.

FIG. 3 illustrates the filter holder 300 with the filter and the spout 400 removed. A pump 302 is disposed within the pump housing 204 and operates to pump water from the intake tube 206 to the pump discharge space 202. With the spout 400 removed, the pump discharge space 202 defines an open top that, during operation is covered and at least partially sealed by the spout 400. In preferred constructions, the pump 302 includes an electric motor that drives an impeller to produce the desired water flow. In some constructions, flow rates of about fifty gallons per hour (190 liters/hour) are employed with higher and lower flow rates being suitable for different aquariums 100.

As illustrated in FIG. 3, the filter holder 300 includes a flange 304 that partially surrounds the filter holder 300 and provides a support mechanism for positioning the filter holder 300 on the edge of the container 102 to support the filter assembly 200 in the desired position. Of course, other support arrangements could be employed to position and support the filter holder 300 in the desired position.

Locking apertures 306 are formed in the flange 304 near the pump discharge space 202. In the illustrated construction, the locking apertures 306 are rectangular with other shapes and arrangements being possible.

Figure 4:
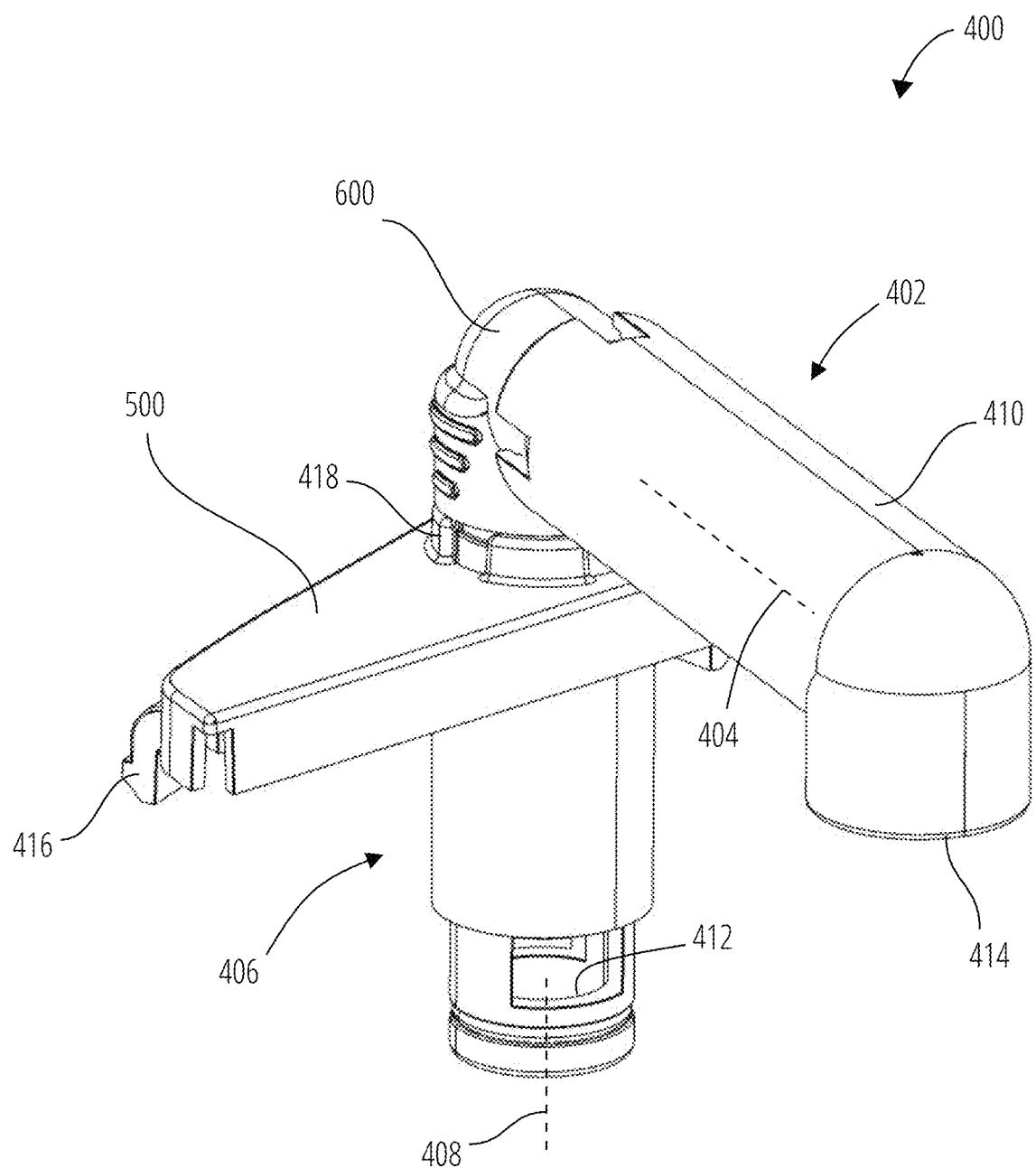
FIG. 4 illustrates a spout for use in the filter assembly of FIG. 2 and in an on position.

As illustrated in FIG. 4, the spout 400 is arranged to include a second arm 406 that extends along a first axis 408 and a second leg 402 that extends along a second axis 404. A bend is formed between the second arm 406 and the second leg 402 such that the first axis 408 and the second axis 404 are arranged substantially normal to one another. Of course, other angular arrangements could be employed if desired.

The second arm 406 is defined by a portion of a tube portion 500 and an angled member 600 while the second leg 402 is defined by another portion of the angled member 600 and an extendable portion 410. The extendable portion 410 is a substantially tubular member that defines a fluid outlet 414 at one end.

Figure 5:
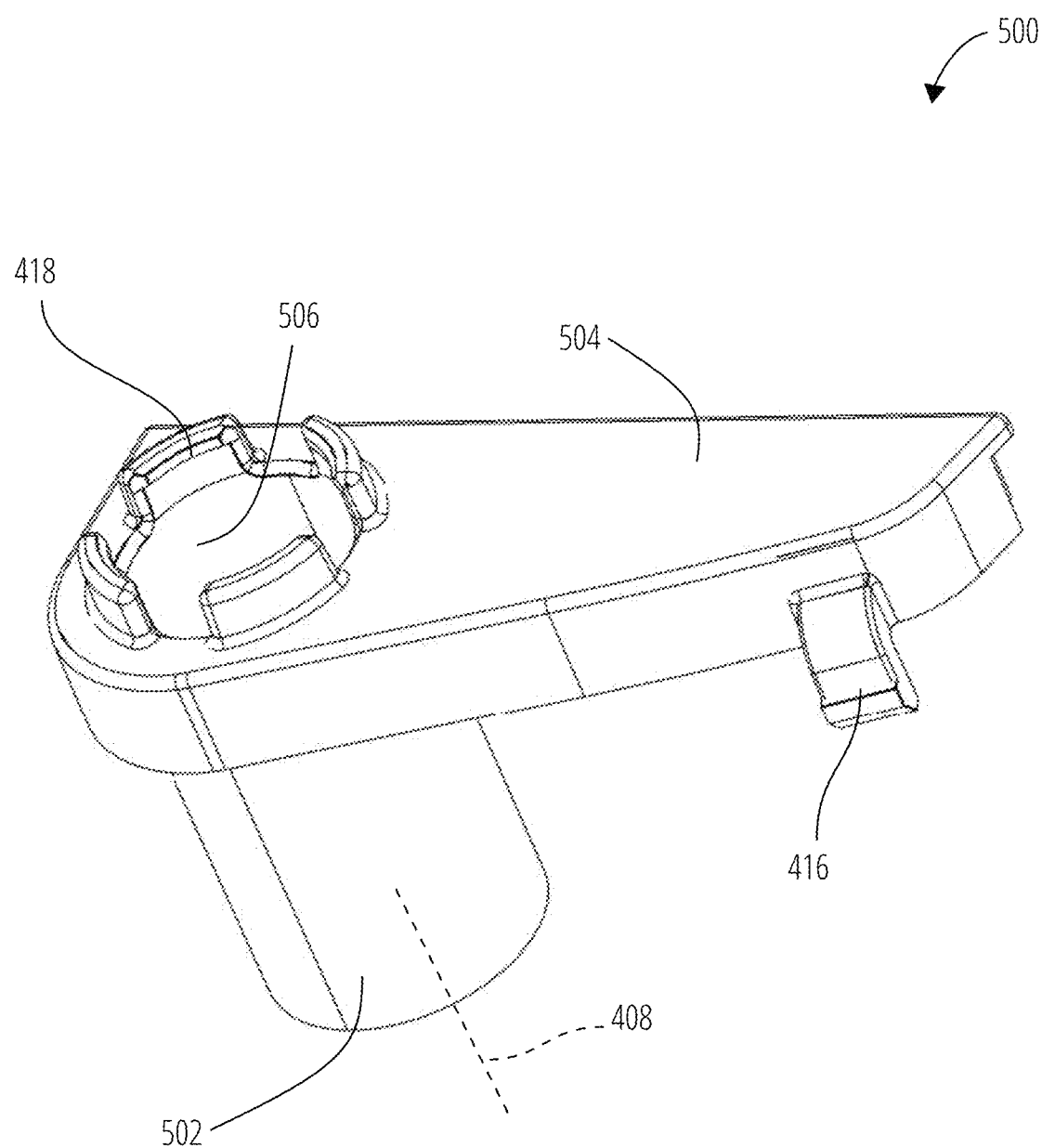
FIG. 5 illustrates a tube portion of the spout of FIG. 4.

As illustrated in FIG. 5, one construction of the tube portion 500 includes a one-piece component that defines an outer tube 502, a cover 504, and a tube passage 506. One or more hooks 416 are formed as part of the tube portion 500 as are one or more stand-offs 418. Of course, some or all of the aforementioned features and components could be formed separately and attached to one another (e.g., using adhesives) to define the tube portion 500.

The outer tube 502 extends along the first axis 408 and defines a hollow opening or tube passage 506. The stand-offs 418 are positioned outside of the tube passage 506 and extend above the cover 504 in the direction of the first axis 408. In the illustrated construction, four stand-offs 418 are provided. However, other constructions could include more or fewer stand-offs 418 as desired.

The cover 504 is shaped to cover the open top of the pump discharge space 202 and form at least a partial seal to inhibit leakage of fluid from the pump discharge space 202. The hooks 416 are arranged to each engage one of the locking apertures 306 to removable attach the tube portion 500 to the filter holder 300. It should be noted that a different number of hooks 416 could be employed or a different design or shape of the hooks 416 (e.g., threaded fasteners) could be employed. In addition, the shape of the cover 504 is not critical to the operation of the filter assembly 200 so long as it conforms with the shape of the opening of the pump discharge space 202.

Figure 6:
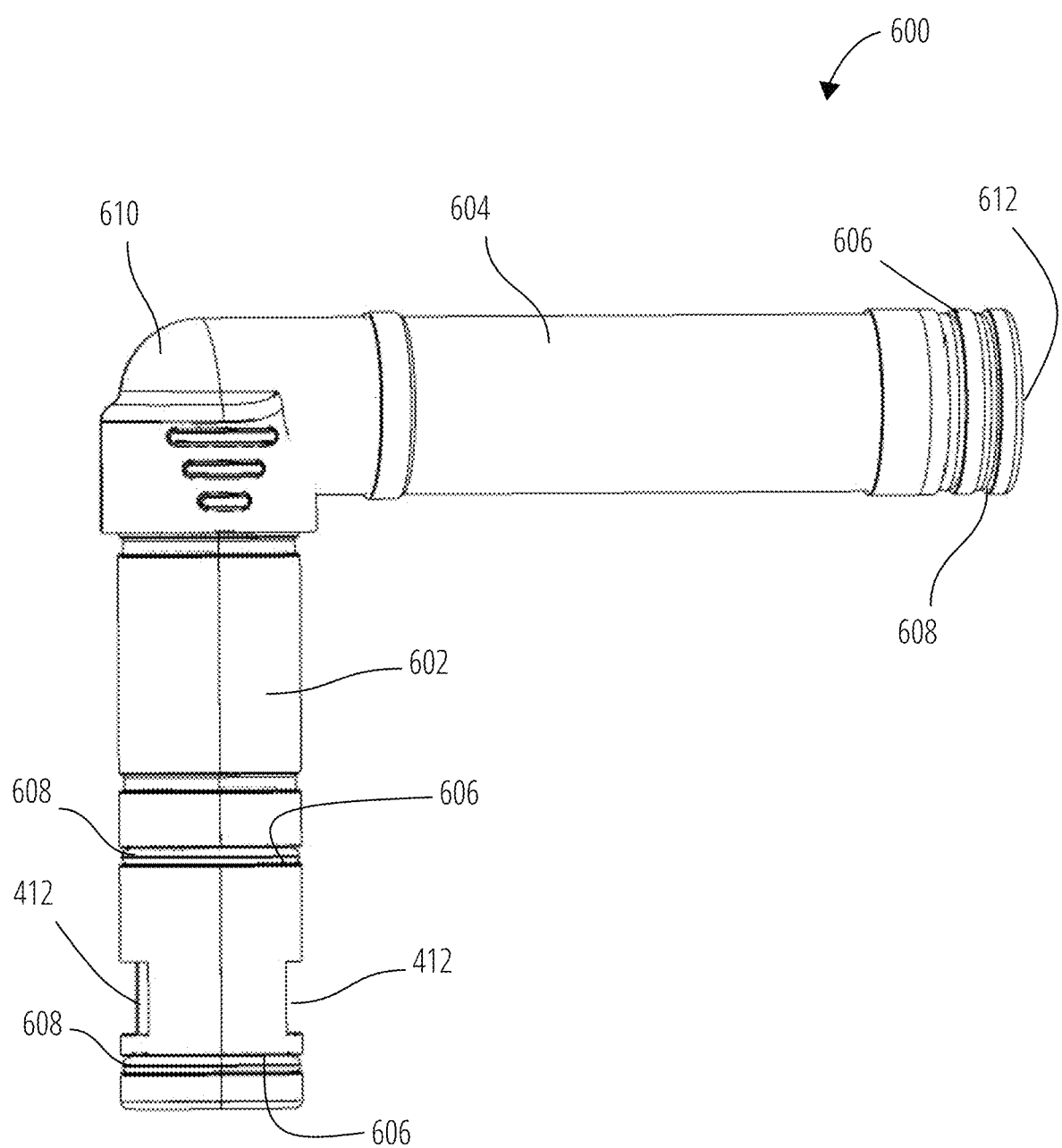
FIG. 6 illustrates an angled member of the spout of FIG. 4.

Turning to FIG. 6, the angled member 600 is illustrated in greater detail. The illustrated angled member 600 includes a first arm 602 that is formed as one piece with a second arm 604 or that is otherwise attached to the second arm 604. For example, in one construction, the first arm 602 threadably engages the second arm 604. In other constructions, an adhesive is used to to attach the first arm 602 and the second arm 604. The first arm 602 defines two inlet apertures 412 with fewer or more inlet apertures 412 being possible. The inlet apertures 412 are formed in the sidewall of the first arm 602 near the end spaced from the second arm 604. A pair of O-ring grooves 606 are formed in the first arm 602 with one O-ring groove 606 positioned on either side of the inlet apertures 412. An O-ring 608 is positioned in each of the O-ring grooves 606. In most constructions, the O-rings 608 have a circular cross-section. However, other cross-sectional shapes or arrangements can be employed as desired.

The second arm 604 includes a bend 610 at one end and an outlet opening 612 at the opposite end. Thus, the second arm 604 cooperates with the first arm 602 to define a continuous flow path from the inlet apertures 412 to the outlet opening 612. A pair of O-ring grooves 606 are formed near the outlet opening 612 and receive a pair of O-rings 608. The O-rings 608 are arranged to engage an interior bore of the extendable portion 410 to form a seal therebetween.

Figure 7:
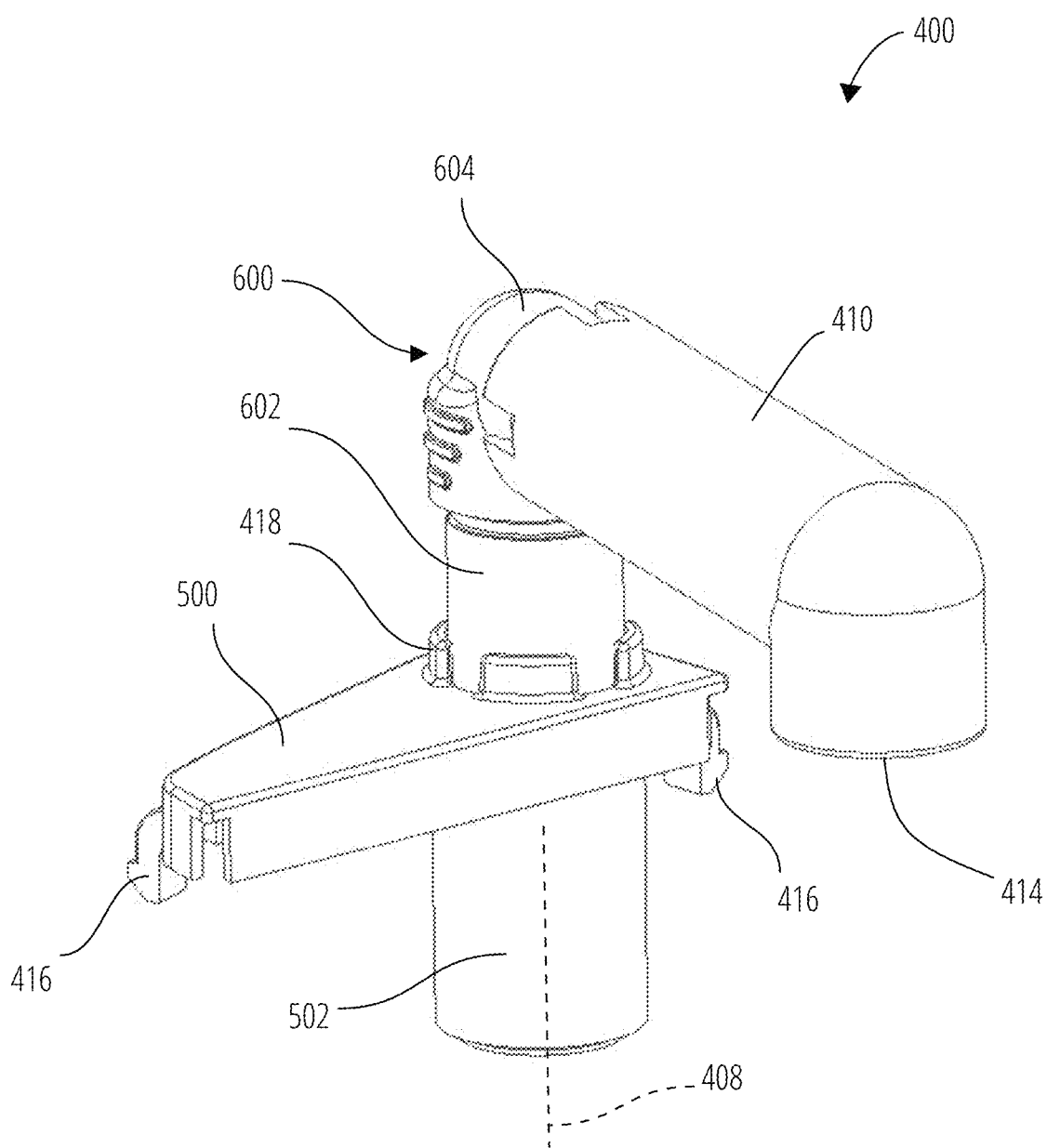
FIG. 7 illustrates the spout of FIG. 4 in an off position.

With reference to FIG. 4 and FIG. 7 some of the operation of the spout 400 will be described. As illustrated, the first arm 602 of the angled member 600 is positioned within the tube passage 506 such that the first arm 602, the second arm 604, and the extendable portion 410 are rotatable 360 degrees about the first axis 408.

In addition, the angled member 600 and the extendable portion 410 are movable with respect to the tube portion 500 along the first axis 408 between an on position illustrated in FIG. 4 and an off position illustrated in FIG. 7. In the on position (FIG. 4), the inlet apertures 412 are exposed and are positioned within the pump discharge space 202 such that fluid from the pump discharge space 202 can flow through the angled member 600, the extendable portion 410 and out through the fluid outlet 414. The second arm 604 contacts the stand-offs 418 to inhibit excess movement in the downward direction toward the on position. In one arrangement, the pump is sized to facilitate the pumping of about 50 gallons of fluid per hour (190 liters/hour). Of course, other arrangements could include larger or smaller pumps that are capable of pumping a greater volume or smaller volume of fluid as may be required.

In FIG. 7, the angled member 600 is moved upward along the first axis 408 to the off position. In this position, the inlet apertures 412 are located fully within the outer tube 502 and the O-rings 608 on either side of the inlet apertures 412 cooperate with the tube passage 506 to form a seal to inhibit the unwanted entry of fluid into the inlet apertures 412 such that no fluid flows through the angled member 600 or out of the fluid outlet 414.

It should be understood that the angled member 600 can be positioned at any point between the on position and the off position to achieve any desired flow rate between the maximum flow rate of the pump and no flow. For example, positioning the angled member 600 halfway between the on position and the off position may produce a flow rate of half the capacity of the pump. Thus, for the example discussed above, a flow rate of 25 g/hour (95 liters/hour) could be achieved. Of course, the angled member 600 and the extendable portion 410 can be rotated about the first axis 408 to any point around the first axis 408 regardless of the position of the angled member 600 between the on position and the off position.

Figure 8:
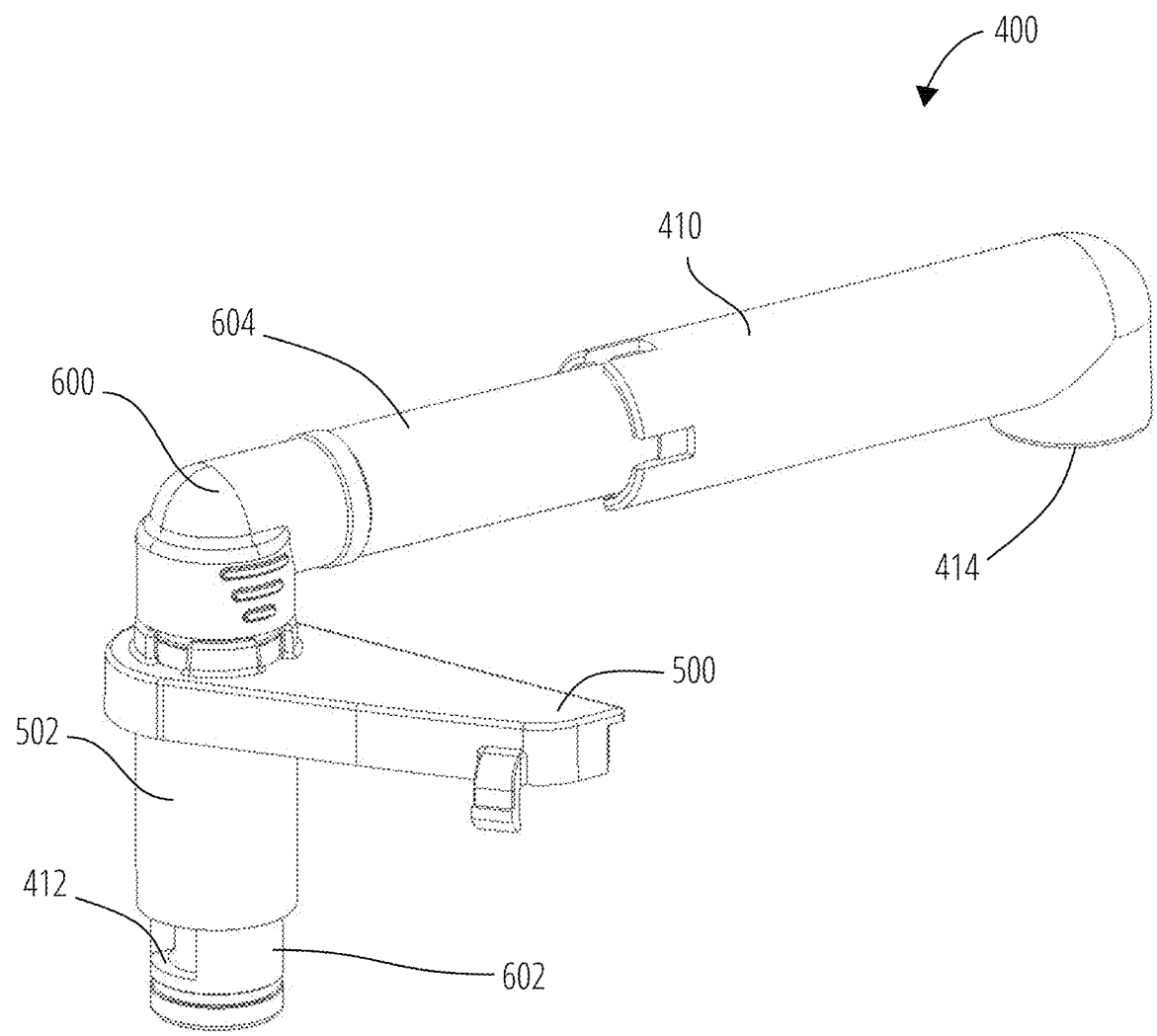
FIG. 8 illustrates the spout of FIG. 4 in the on position with an extension extendable portion in an extended position.

FIG. 8 illustrates another adjustment provided by the spout 400. Specifically, the extendable portion 410 engages the second arm 604 and is movable in a telescoping fashion with respect to the angled member 600 along the second axis 404 between a fully retracted position illustrated in FIG. 4 and FIG. 7 and a fully extended position illustrated in FIG. 8.

The O-rings 608 positioned on the end of the second arm 604 engage the interior of the extendable portion 410 and form a seal to inhibit unwanted leakage between the second arm 604 and the extendable portion 410.

Figure 9:
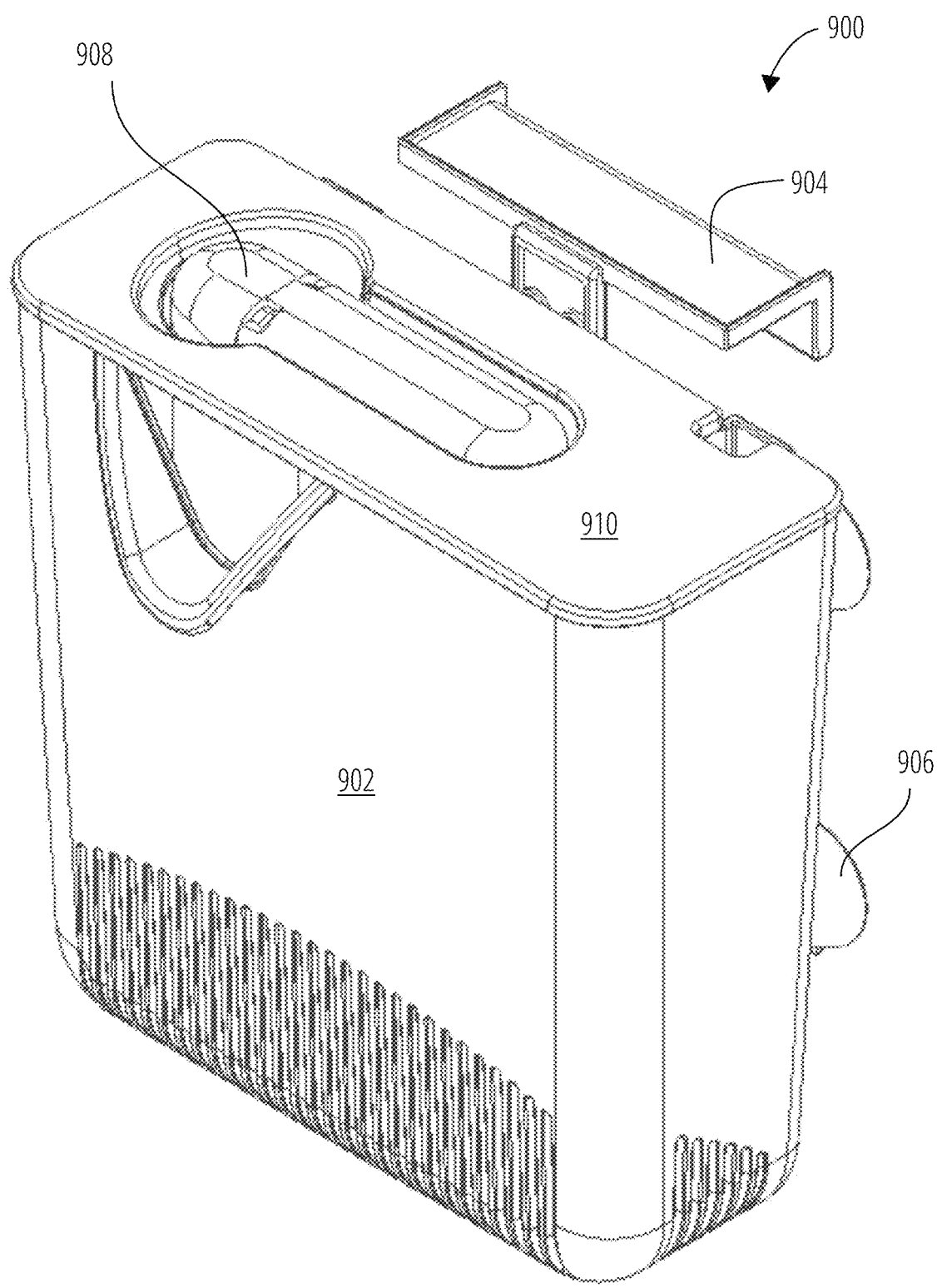
FIG. 9 illustrates another filter assembly including a spout in an operating or filtering position.

FIG. 9 illustrates another construction of a filter assembly 900 that is arranged to be disposed with the container 102 and substantially below the water line 108. The filter assembly 900 includes a filter housing 902 (or filter holder), a hanger 904, and one or more suction cups 906. The hanger 904 is arranged to engage the rim of the container 102 to hang the filter housing 902 within the container 102. The suction cups 906 engage a wall of the container 102 to inhibit unwanted movement of the filter housing 902.

The filter housing 902 defines an uppermost surface 910 that generally defines the top of the filter housing 902 when the filter housing 902 is positioned in an operating position within the container 102. An opening is formed in the uppermost surface 910.

The filter assembly 900 also includes a spout 908 that is similar to the spout 400 discussed with regard to FIGS. 1-8 and that is sized to fit within the opening in the uppermost surface 910. In FIG. 9, the spout 908 is positioned in an on or filtering position in which the pump cycles fluid through a filter element disposed within the filter housing 902. In this position, the spout 908 is fully at or below the level of the uppermost surface 910. Thus, the spout 908 is recessed within the filter assembly 900, and more specifically beneath the uppermost surface 910 during normal filtering operation. Of course, other constructions could include an arrangement in which some or all of the spout 908 is positioned at or above the level of the uppermost surface 910.

Figure 10:
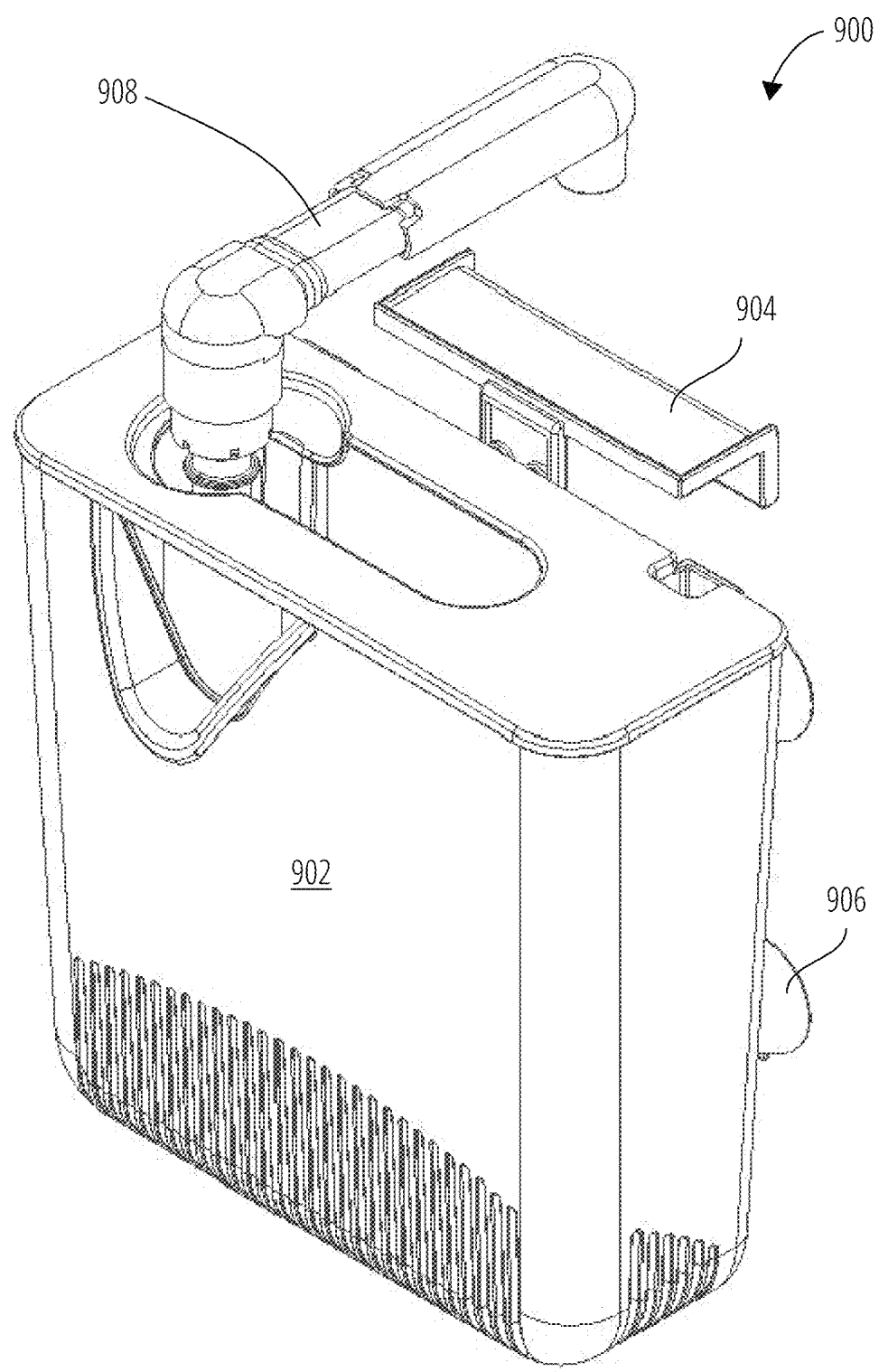
FIG. 10 illustrates the filter assembly of FIG. 9 with the spout in a second position.

FIG. 10 illustrates the spout 908 in a second position in which fluid is not cycled through the filter but rather is discharged out of the container 102 to allow for the changing of some or all of the fluid in the container 102. The spout 908 is substantially the same as the spout 400 and operates in much the same manner.

Figure 11:
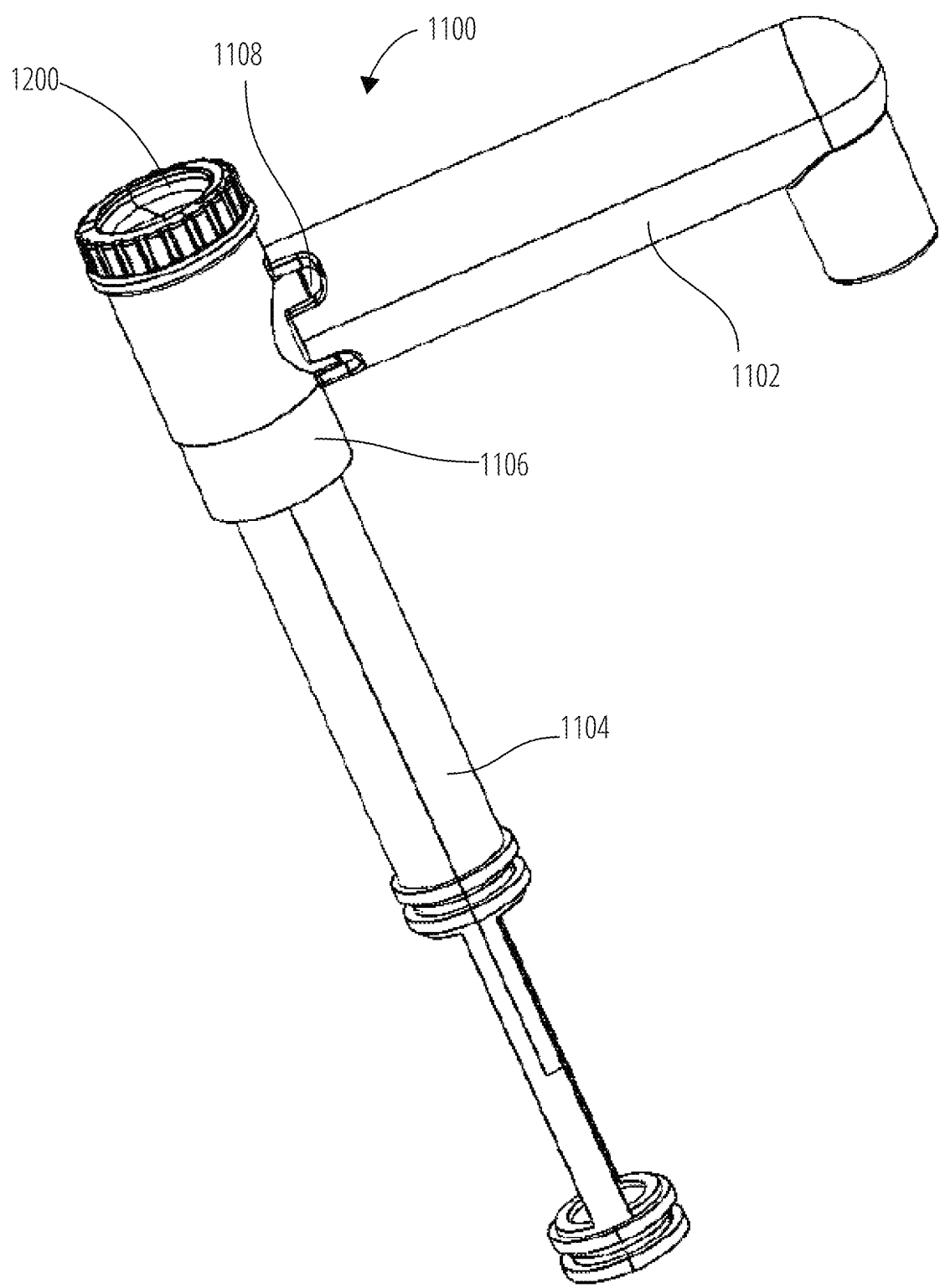
FIG. 11 is a perspective view of a spout including a cap and suitable use with an aquarium.

FIG. 11 illustrates an alternative spout 1100 that could be used as the spout for any of the foregoing embodiments as well as the embodiments associated with FIG. 11 through FIG. 15. The spout 1100 includes an extendable portion 1102, a first arm 1104, a second arm 1108, and an angled member 1106 that are all similar to those components already described with regard to FIG. 1 through FIG. 10.

Specifically, the angled member 1106 supports the first arm 1104 in a position that allows an opening or inlet to be positioned in the bottom portion of an aquarium or other liquid-containing container. The angled member 1106 also supports the second arm 1108 in a position above the first arm 1104 and at an angle of about ninety degrees with respect to the first arm 1104. The extendable portion 1102 is received on the second arm 1108 in a manner similar to that described earlier to allow the extendable portion 1102 to move between a retracted position illustrated in FIG. 11 to an extended position similar to that shown in FIG. 8.

Like the previously described angled members, the angled member 1106 of FIG. 11 includes an inlet aperture 1502 (shown in FIG. 15) that receives fluid into the first arm 1104 and an outlet aperture 1504 (shown in FIG. 15) that discharges the fluid to the extendable portion 1102. A flow aperture 1510 is formed at the intersection of the bores defined by the first arm 1104 and the second arm 1108. Unlike the previously described angled members, the angled member 1106 also includes a cap aperture 1506 (shown in FIG. 15) that is arranged to receive a cap 1200 as illustrated in FIG. 11.

Figure 12:
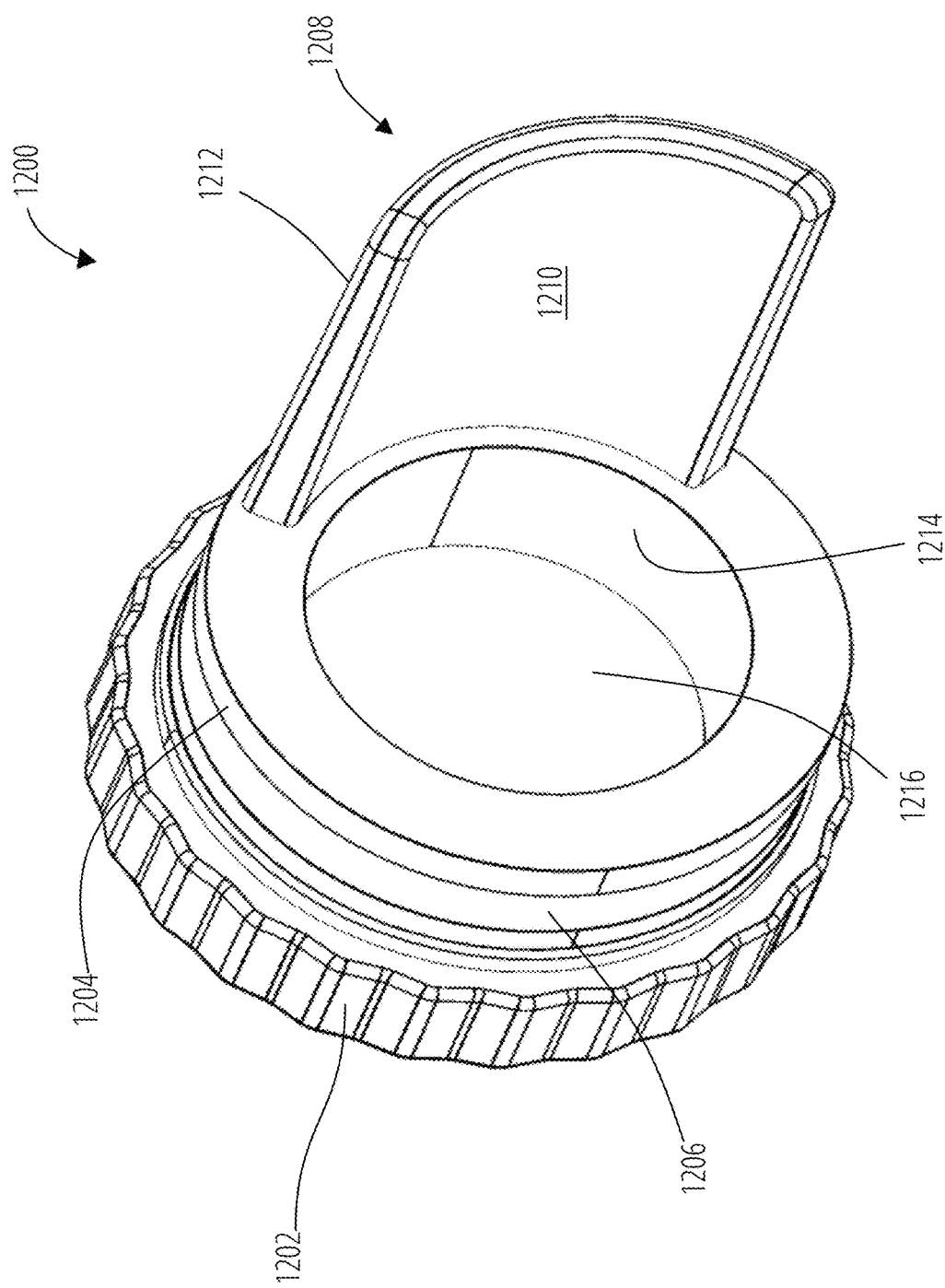
FIG. 12 is a perspective view of the cap of FIG. 11.
Figure 13:
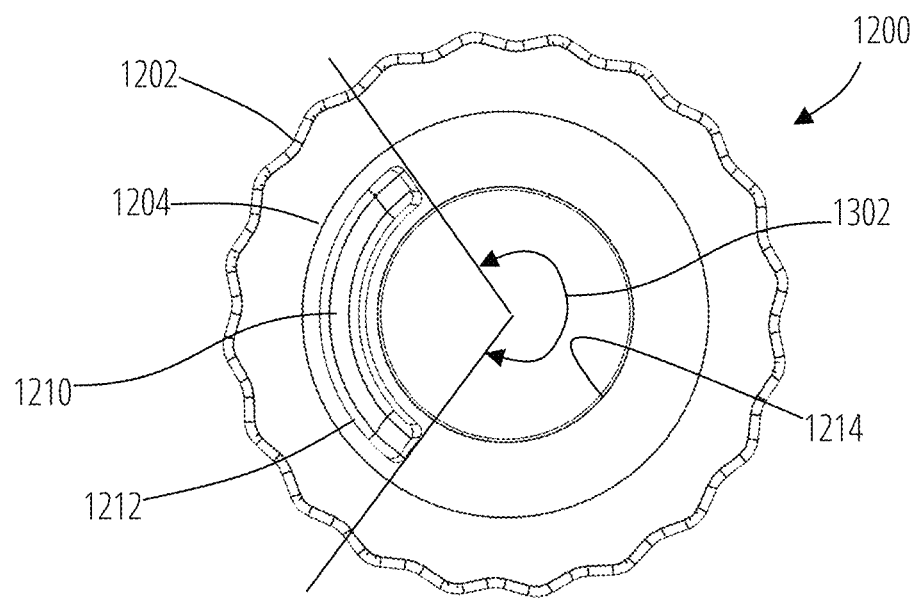
FIG. 13 is an axial bottom or inside view of the cap of FIG. 11.
Figure 14:
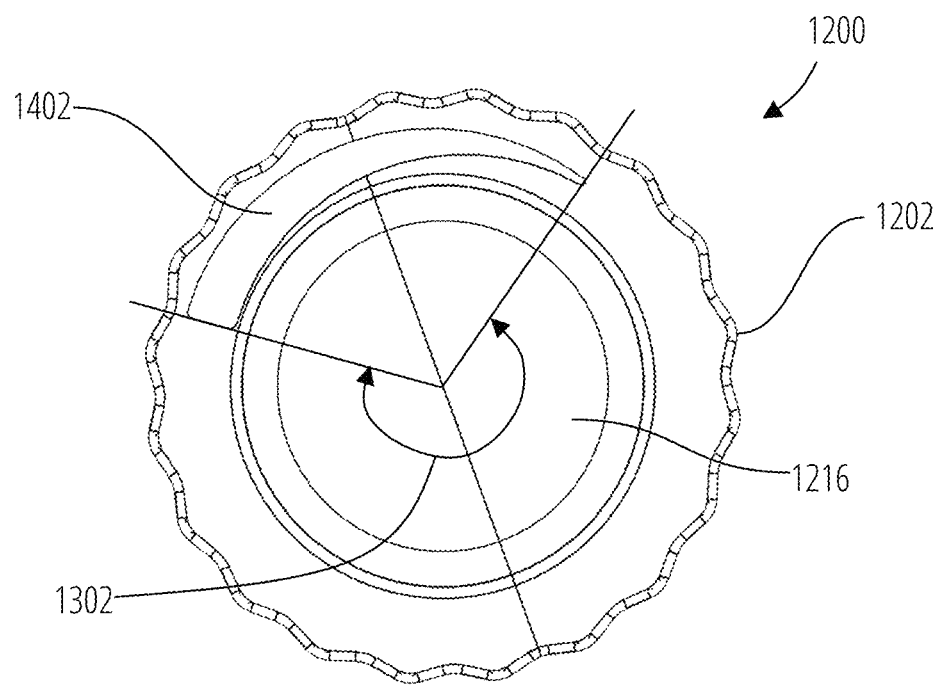
FIG. 14 is an axial top or outside view of the cap of FIG. 11.

Turning to FIG. 12 through FIG. 14, the cap 1200 is illustrated in greater detail. FIG. 12 best illustrates the internal components of the cap 1200. In the illustrated construction, the cap 1200 includes a gripping portion 1202, a seal face 1204, an O-ring groove 1206 formed in the seal face 1204, and a flow control member 1208. The gripping portion 1202 of the illustrated construction is formed with a wave pattern that results in a plurality of peaks and valleys that cooperate to enhance a user's grip on the cap 1200. In other constructions, a differently shaped gripping portion 1202 or a different surface treatment (e.g., knurled surface) may be employed to make gripping and moving (i.e., rotating) the cap 1200 easier.

The seal face 1204 includes a cylindrical surface formed on a boss that extends from the gripping portion 1202 along a central axis of the cap 1200. The flow control member 1208 extends from the boss or the gripping portion 1202 in a direction substantially parallel to the central axis of the cap 1200. The flow control member 1208 defines one or more seal surfaces 1212 that operate to control the flow through the spout 1100 as will be discussed in greater detail with regard to FIG. 15.

In the illustrated construction, the flow control member 1208 includes a panel 1210. The panel 1210 is cylindrical in shape and extends around a portion or arc length of the central axis of the cap 1200 to define a seal surface 1212. In the illustrated construction, a single panel is employed to define the flow control member 1208. However, other constructions may employ more than one panel to define the flow control member 1208 if desired. In addition, the size of the panel 1210 could be the same as any other panels that may be employed, or the sizes (e.g., the length or the width) of one of the panels could vary with respect to the other panels. Thus, there is no requirement that all the panels, if multiple panels are employed be identical.

In some constructions, including the illustrated construction, the gripping portion 1202 and the boss on which the seal face 1204 is formed are annular such that they define a viewing bore 1214 that is covered by a viewing window 1216. The viewing window 1216 is formed from glass, plexiglass, or another translucent or transparent material to allow a user to view the fluid flowing through the angled member 1106 via the viewing bore 1214. Of course, other constructions may omit the viewing bore 1214 and the viewing window 1216 if desired.

FIG. 13 better illustrates the positioning of the panel 1210. As illustrated, the panel 1210 (which defines the flow control member 1208) defines an open angle 1302 which is 360 degrees less the angle covered by the panel 1210. In the illustrated construction, the panel 1210 closes an angle of about 90 degrees which leaves an open angle 1302 of about 270 degrees. Thus, the panel 1210 extends around a partial arc of about 90 degrees. Of course, other constructions could include different open angles 1302. In preferred constructions, the arc length covered by the flow control member 1208 (e.g., the panel 1210) is between 60 degrees and 300 degrees with more preferred arc lengths being between 60 degrees and 180 degrees, and most preferred arc lengths being between 80 degrees and 120 degrees. It should be noted that the term "about" or other like terms when used to reference the arc length covered by the flow control member 1208, or any angle should be considered to include the angles mention plus or minus 10 degrees.

As should be understood, different constructions may include more than one panel and may include panels that cover less than 90 degrees, or more than 90 degrees as may be desired. In addition, a panel or panels that include tapered edges, one or more apertures, variably sized apertures, or multiple apertures could be employed to better control the flow through the flow aperture 1510 if desired.

To help the user position the cap 1200 in the desired position, the top surface of the cap 1200 includes a position indicator, or indicator 1402 as illustrated in FIG. 14. The position indicator includes an indicator 1402 that corresponds with the panel 1210 such that the indicator 1402 defines an open angle 1302 that corresponds with the open angle 1302 described with regard to FIG. 13. The indicator 1402 shows the user the position of the panel 1210 to allow the user to determine where the panel 1210 is and thus, the level of flow that may pass through the angled member 1106. While the illustrated construction includes an individual indicator 1402 that correspond to the individual panel 1210, this is not a requirement as multiple indicators 1402 could also be employed if desired.

Figure 15:
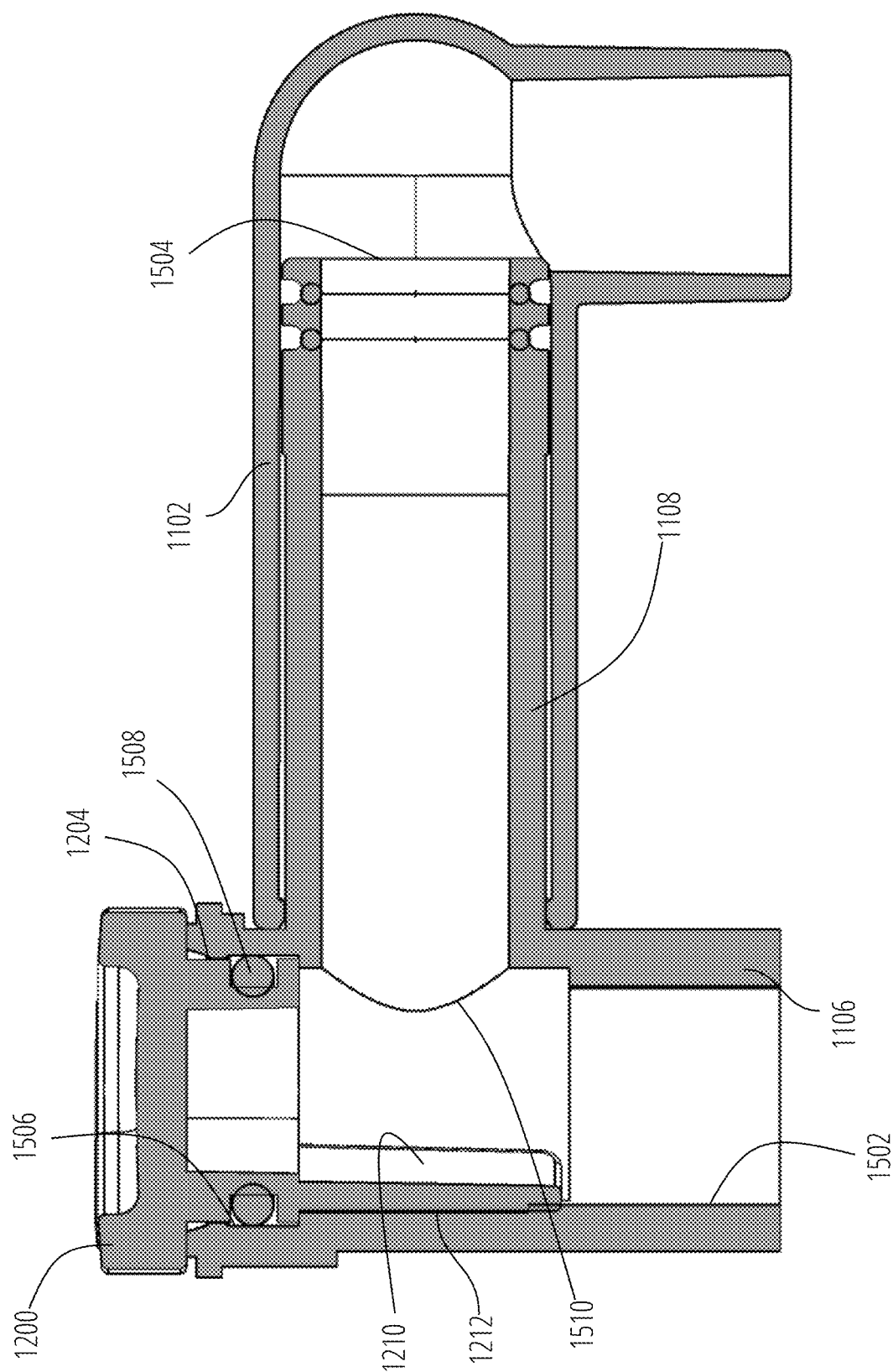
FIG. 15 is a section view of the spout of FIG. 11 taken along the long axis of an extendable portion.

FIG. 15 better illustrates the positioning and operation of the cap 1200 within the angled member 1106. In FIG. 15, the cap 1200 is shown in a full open position with the panel 1210 opposite the flow aperture 1510. The cap 1200 is received by the cap aperture 1506 such that the seal face 1204 and an O-ring 1508 positioned within the O-ring groove 1206 form a seal that inhibits leakage between the cap 1200 and the angled member 1106. In addition, the O-ring 1508 is sized to establish sufficient frictional resistance to inhibit the unwanted removal of the cap 1200 from the angled member 1106. With the cap 1200 in an operating position, the flow control member 1208 extends into a position where the panel 1210 can be positioned to block flow through the flow aperture 1510 which provides entry into the second arm 1108. In the illustrated construction, the seal surface 1212 of the panel 1210 closely matches the shape of the bore that forms the flow aperture 1510 such that it can completely (or substantially) close the flow aperture 1510 if desired. The user can rotate the cap 1200 to align some of the open angle 1302 with the flow aperture 1510 to allow a controlled amount of flow through the flow aperture 1510. As more of the open angle 1302 is aligned with the flow aperture 1510, more flow can pass until a maximum flow is reached when the entire flow aperture 1510 is aligned with the open angle 1302 (i.e., the flow aperture 1510 is completely unblocked as illustrated in FIG. 15).

In the arrangement illustrated in FIG. 15, as the user rotates the cap 1200 an ever increasing or decreasing portion of the arc length upstream of the flow aperture 1510 is exposed or covered over the full height of the flow aperture 1510. Thus, rotation from the first position in which the flow aperture 1510 is completely blocked to the second position in which the flow aperture 1510 is completely unblocked results in a continuously increasing flow area between the first position and the second position.

In other constructions, the panel 1210 could include an edge having an oblique angle with respect to the central axis of the cap 1200. This arrangement would expose or cover less than the full height of the flow aperture 1510 to allow finer control of the flow. In still other constructions, one or more apertures may be formed in the panel 1210. The apertures could be positioned and sized to provide a uniformly increasing flow area as the user rotates the cap 1200 to again provide finer control of the flow. In still other constructions, a single aperture that varies in size in the circumferential direction or different sized apertures could be employed to control the flow.

While the illustrated construction employs a cap 1200 that rotates between a first minimum flow position and a second maximum flow position, other constructions may include a cap that moves longitudinally along the central axis of the cap 1200 or that uses a combination of rotation and axial movement to adjust the flow through the flow aperture 1510.

With reference to FIGS. 2-4, the assembly and operation of the filter assembly 200 will be described. As illustrated in FIG. 3, the pump is disposed within the pump housing 204 and is operable to provide a flow of fluid to the pump discharge space 202. The spout 400 is positioned such that the cover 504 of the tube portion 500 covers and substantially seals the opening of the pump discharge space 202 such that water within this space is forced into the spout 400 so long as the spout is not in the off position. Any fluid that cannot flow into the spout 400 flows back into the container 102 and does not pass through the filter. Fluid that enters the spout 400 flows through the angled member 600 and exits the spout 400 via the fluid outlet 414. If the fluid outlet 414 is positioned above the filter space 106 and the filter positioned therein, the fluid passes through the filter and back into the container 102 via the discharge channel 208. If the fluid cannot pass through the filter at the rate at which it is discharged into the filter space 106, the excess fluid will flow through the overflow chute 210 and back into the container 102 without passing through the filter.

Users can adjust the flow rate by moving the angled member 600 along the first axis 408 as described with regard to FIG. 7. In addition, a user can adjust the discharge point by extending the extendable portion 410 along the second axis and/or by rotating the angled member 600 and the extendable portion 410 about the first axis 408. In addition, the spout 400 can be adjusted to discharge fluid to a point outside of the container 102 to remove some of the fluid to allow for a partial fluid change if desired.

With reference to FIG. 15 the cap 1200 is installed by moving the cap 1200 axially into position. The O-ring 1508 engages the angled member 1106 to form a seal, inhibit unwanted leakage, and inhibit unwanted axial movement, while still allowing for rotation of the cap 1200 about its central axis. The cap 1200 is rotatable between a first position in which a minimum flow (preferably zero flow) passes through the spout 1100 and a second position (illustrated in FIG. 15) in which a maximum flow rate passes through the spout 1100. In preferred constructions, the amount or level of flow that passes through the spout 1100 varies continuously or uniformly between the first position and the second position. In some constructions, the flow level varies in a linear fashion with other constructions varying differently. In some constructions, a stop mechanism is provided to inhibit rotation beyond one full revolution, or even a partial revolution. In other words, the first position and the second position are separated by 360 degrees or less.

The use of a cap 1200 provides a user with finer control over the flow through the spout 1100, thereby assuring greater control over the desired level of filtration, water removal, water treatment, or any other function desired.

Although exemplary embodiments of the invention have been described in detail with reference to certain preferred embodiments, those skilled in the art will understand that variations and modifications exist within the scope and spirit of one or more independent aspects of the invention as described and recited in the following claims.

What is claimed is:

1. An aquarium comprising:
a container defining a perimeter and an aquarium space;
a filter space arranged to receive a fluid;
a filter holder coupled to the container, the filter holder defining the filter space, the filter holder operable to direct the fluid from the filter space into the container;
a pump operable to draw the fluid from the container; and
a spout coupled to the pump to selectively receive the fluid, the spout including a first leg that extends along a first axis and a second leg that extends along a second axis and defines an outlet, the first leg and the second leg cooperating to define a flow aperture;
a cap coupled to the spout and movable between a first position and a second position; and
a flow control member coupled to the cap and movable with the cap between the first position where a low level of flow passes through the flow aperture and the second position where a high level of flow passes through the flow aperture, wherein the spout is movable along the first axis between an on position in which fluid from the pump flows through the spout and is discharged through the outlet and an off position in which no fluid flows through the spout.

2. The aquarium of claim 1, wherein the cap is rotatable about the first axis between the first position and the second position, and wherein the first position and the second position are spaced 360 degrees or less from one another.

3. The aquarium of claim 1, wherein the spout is extendable along the second axis to a desired operating position between a retracted position and an extended position.

4. The aquarium of claim 1, wherein the flow control member is sized to completely cover the flow aperture with the cap positioned in the first position to inhibit flow through the flow aperture, and wherein movement of the cap from the first position toward the second position moves the flow control member to open a portion of the flow aperture.

5. The aquarium of claim 4, wherein the flow control member extends circumferentially around the first axis to define a first arc length, the first arc length being between 60 degrees and 300 degrees.

6. The aquarium of claim 4, wherein the flow control member extends circumferentially around the first axis to define a first arc length, the first arc length being between 60 degrees and 180 degrees.

7. The aquarium of claim 4, wherein the flow control member extends circumferentially around the first axis to define a first arc length, the first arc length being between 80 degrees and 120 degrees.

8. The aquarium of claim 1, further comprising an indicator coupled to the cap and positioned to correspond with the flow control member to provide a visual indication of the position of the flow control member.

9. An aquarium comprising:
a container defining a perimeter and an aquarium space;
a filter holder disposed within the perimeter and including a filter space, a pump space, and a pump discharge space;
a pump positioned within the pump space and operable to draw a fluid from the container and discharge the fluid into the pump discharge space; and
a spout including a first leg that extends along a first axis from an inlet to a bend, and a second leg that extends along a second axis from a flow aperture formed adjacent the bend to an outlet where the fluid is discharged;
a cap coupled to the spout and rotatable about the first axis between a first position and a second position; and
a flow control member fixedly attached to the cap and sized to completely block the flow aperture when the cap is in the first position and to continuously increase the amount of the flow aperture that is not blocked as the cap is rotated from the first position toward the second position, wherein the cap is configured to be rotated from the first position to the second position and vis versa during pump operation.

10. The aquarium of claim 9, wherein the cap is rotatable about the first axis between the first position and the second position, and wherein the first position and the second position are spaced 360 degrees or less from one another.

11. The aquarium of claim 9, wherein the flow control member extends circumferentially around the first axis to define a first arc length, the first arc length being between 60 degrees and 300 degrees.

12. The aquarium of claim 9, wherein the flow control member extends circumferentially around the first axis to define a first arc length, the first arc length being between 80 degrees and 120 degrees.

13. The aquarium of claim 9, wherein the flow control member extends circumferentially around the first axis to define a first arc length, first arc length being between 60 degrees and 180 degrees.

14. The aquarium of claim 9, further comprising an indicator coupled to the cap and positioned to correspond with the flow control member to provide a visual indication of the position of the flow control member.

15. An aquarium comprising:
a container defining a perimeter and an aquarium space that contains a liquid;
a spout including a first leg that extends along a first axis from an inlet positioned in a bottom portion of the aquarium space to a bend, and a second leg that extends along a second axis from a flow aperture formed adjacent the bend to an outlet, the spout arranged to direct a portion of the liquid from the inlet to the outlet;
a cap coupled to the spout and rotatable between a first position and a second position, the cap including;
a seal element positioned to form a seal between the cap and the spout;
a pump operable to draw a fluid from the container; and
a flow control member fixedly attached to the cap and sized to completely block the flow aperture when the cap is in the first position and to completely uncover the flow aperture when the cap is in the second position, wherein the cap is configured to be rotated from the first position to the second position and vis versa during pump operation.

16. The aquarium of claim 15, wherein a portion of the flow aperture that is uncovered by the flow control member continuously increases as the cap is rotated from the first position toward the second position.

17. The aquarium of claim 15, wherein the flow control member extends circumferentially around the first axis to define a first arc length, the first arc length being between 60 degrees and 300 degrees.

18. The aquarium of claim 15, wherein the flow control member extends circumferentially around the first axis to define a first arc length, the first arc length being between 80 degrees and 120 degrees.

19. The aquarium of claim 15, wherein the flow control member extends circumferentially around the first axis to define a first arc length, the first arc length being between 60 degrees and 180 degrees.

* * * * *